United States Patent
Sun et al.

(10) Patent No.: US 10,254,582 B2
(45) Date of Patent: Apr. 9, 2019

(54) LIQUID CRYSTAL DISPLAY DEVICE

(71) Applicant: Shenzhen China Star Optoelectronics Technology Co., Ltd., Shenzhen (CN)

(72) Inventors: Zhenhua Sun, Shenzhen (CN); Lixuan Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 213 days.

(21) Appl. No.: 15/119,725

(22) PCT Filed: Jul. 20, 2016

(86) PCT No.: PCT/CN2016/090577
§ 371 (c)(1),
(2) Date: Aug. 18, 2016

(87) PCT Pub. No.: WO2017/219419
PCT Pub. Date: Dec. 28, 2017

(65) Prior Publication Data
US 2018/0180936 A1    Jun. 28, 2018

(30) Foreign Application Priority Data
Jun. 20, 2016 (CN) .......................... 2016 1 0451260

(51) Int. Cl.
*G02F 1/1335* (2006.01)
*G02B 5/30* (2006.01)

(52) U.S. Cl.
CPC ...... *G02F 1/133528* (2013.01); *G02B 5/3041* (2013.01); *G02F 1/133533* (2013.01); *G02F 2001/133545* (2013.01)

(58) Field of Classification Search
CPC .. G02F 1/133528; G02F 1/0311; G02F 1/116; G02F 1/1335; G02F 1/133536; G02F 1/13362; G02F 1/133533; G02F 2001/133531; G02F 2001/133521; G02F 2001/13356; G02F 2001/133538; G02F 2001/133541; G02F 2001/133543;
(Continued)

(56) References Cited

U.S. PATENT DOCUMENTS 6,296,927 B1 * 10/2001 Jonza ................... B29C 55/023
                                                          428/212
2006/0126066 A1 * 6/2006 Kawakami ........... G02B 27/288
                                                          356/364
(Continued)

*Primary Examiner* — Shan Liu
(74) *Attorney, Agent, or Firm* — Leong C. Lei

(57) ABSTRACT

The invention provides an LCD device, whose polarizers comprising: a plurality of polarizing units disposed corresponding to the first, second and third sub-pixels and arranged in an array; each polarizing unit being a multilayer film structure, comprising a transparent body, and a plurality of first film layers and a plurality of second film layers interleaved into a stack disposed on the body. By achieving polarization through multilayer film structure and each polarizing unit only needing to satisfy polarization conditions for light of the wavelength range of light emitted by corresponding sub-pixel, the invention can reduce material selection difficulty and production difficult for multilayer structure and improve LCD contrast.

18 Claims, 2 Drawing Sheets

(58) Field of Classification Search
CPC ........ G02F 2001/133545; G02F 2001/133548;
G02F 2001/13355; G02F 2001/133562;
G02F 2001/133567; G02F 2203/16; G02F
1/1347; G02F 1/13471; B29D 11/00644;
B32B 17/10458; B32B 2307/42; H01L
51/5293; H01R 12/7005; H04B 10/532;
G01J 5/0825; G02B 5/3033; G02B
6/0056; G02B 6/02109; G02B 5/3016;
G02B 5/3041; G03F 9/7065; G01R
33/3678; C09K 19/0208
USPC ........................ 349/96–103, 194; 359/485.03
See application file for complete search history.

(56) References Cited

U.S. PATENT DOCUMENTS

| | | | | |
|---|---|---|---|---|
| 2007/0047111 | A1* | 3/2007 | Lee ........................ | G02B 5/045 |
| | | | | 359/831 |
| 2009/0316262 | A1* | 12/2009 | Kittaka ................ | G02B 5/3041 |
| | | | | 359/485.01 |
| 2012/0162553 | A1* | 6/2012 | Lee ........................ | G02B 27/26 |
| | | | | 349/15 |
| 2014/0139787 | A1* | 5/2014 | Ki ........................ | G02B 5/3041 |
| | | | | 349/96 |
| 2015/0346498 | A1* | 12/2015 | Zhong .................... | G02B 27/22 |
| | | | | 349/61 |
| 2016/0124132 | A1* | 5/2016 | Choi .................... | G02B 5/3041 |
| | | | | 359/485.04 |
| 2016/0238766 | A1* | 8/2016 | Huang .................. | G02B 5/305 |

\* cited by examiner

LIQUID CRYSTAL DISPLAY DEVICE

BACKGROUND OF THE INVENTION

1. Field of the Invention

The present invention relates to the field of display, and in particular to a liquid crystal display (LCD) device.

2. The Related Arts

The liquid crystal display (LCD) has the advantages of thinness, low power-consumption, and no radiation, and are widely used in applications, such as, mobile phone, LCD-TV, personal digital assistant (PDA), digital camera, notebook PC, desktop PC, and so on, and becomes the mainstream display technology.

The majority of the LCD devices are of the backlight type, which comprises an LCD panel and a backlight module. The operation principle of the LCD device is to utilize the optical characteristics and birefringence of the liquid crystal. By using a voltage to control the rotation of liquid crystal to make the linearly polarized light from the lower polarizer rotate and emit from the upper polarizer (perpendicular to the polarization direction of the upper polarizer), the upper and lower polarizers and the liquid crystal cell function as a light switch. Therefore, a polarizer must be attached respectively to the upper and the lower sides of the LCD panel.

The conventional polarizer is mainly an absorbing polymer polarizer, which achieves polarization by adding material having a polarizing effect to the polymer film. The operation principle of polarization is as follows. Because the light wave is a shear wave, whose vibration direction is perpendicular to the propagation direction, the component of the light having the same polarization direction as the polarizer can pass, and the component having the polarization direction perpendicular to the polarizer will be absorbed by the polarizer. Therefore, the light passing the polarizer will become a linearly polarized light. The polymer polarizer, based on the molecular type absorbed by the polarizer, can generally be divided into two categories: iodine-based polarizer, and dye-based polarizer. The iodine-based polarizer has the advantages of high transmittance and high degree of polarization, but has poor tolerance to high temperature and high humidity. The dye-based polarizer has the disadvantages of low transmittance and low degree of polarization, but has good tolerance to high temperature and high humidity. It is therefore desirable to provide an LCD device to address the above problems.

The vibration direction of a light wave is perpendicular to the propagation direction. By dividing the light into a P component with the vibration direction lying in the plane formed by the incident light and the normal, i.e., incident plane, and an S component perpendicular to the planed formed by the incident light and the normal. When a natural light is reflected by an interface, a polarization state change occurs. Specifically, when the incident light enters at Brewster angle, the reflected light will be completely linearly polarized, which is the S-polarized light with vibration direction perpendicular to the incident plane, and the transmitted light will be partially polarized light. Then, when the light is reflected off many times by this type of interface, the S-polarized light and P-polarized light can be completely separated. Therefore, by constructing a multilayer film structure, the backlight is incident at a specific angle to achieve polarization. For single homogeneous multilayer film structure, the polarizing film layer can accomplish the polarization separation, but some disadvantages exist. To accomplish the polarization separation for the entire visible light band, the glass substrate, the high and low refractive index materials must meet certain requirements in each band. However, because the same material has different refractive indices for light of different wavelengths, the presence of the color dispersion of material results stringent requirements for the materials used in a multilayer film structure.

SUMMARY OF THE INVENTION

The object of the present invention is to provide an LCD device, able to improve the thermal stability, moisture resistance, and reliability of the polarizer, and reduce selection requirements and the production difficulty of LCD polarizer.

To achieve the above object, the present invention provides an LCD, which comprises: a backlight module, an LCD panel disposed above the backlight module, and two polarizers disposed at the two sides of the LCD panel; the LCD panel comprising: a first sub-pixel, a second sub-pixel, and a third sub-pixel arranged in an array, the first, second and third sub-pixels emitting different color of light; each polarizer comprising: a plurality of polarizing units disposed respectively corresponding to the first, second and third sub-pixel arrays; each polarizing unit being a multilayer film structure, comprising a transparent body, and a plurality of first film layers and a plurality of second film layers interleaved into a stack disposed on the body; for the polarizing unit disposed corresponding to each sub-pixel, the polarizing unit satisfying the following equation for the light within the wavelength range of the light emitted by the sub-pixel:

$$\frac{n_H^2 n_L^2}{n_H^2 + n_L^2} = n_G^2 \operatorname{Sin}^2 \theta_G$$

Wherein $n_H$ being the refraction index of the first film layer regarding the light within the wavelength range, $n_L$ being the refraction index of the second film layer regarding the light within the wavelength range, $n_H > n_L$, $n_G$ being the refraction index of the body regarding the light within the wavelength range, and $\Theta_G$ being the angle between the light within the wavelength range and the body normal inside the body.

The first, second and third sub-pixels emit light of red, green and blue respectively.

The polarizers are formed by vapor deposition, sputtering or spin coating.

The sum of the number of layers in the first film layer and the second film layer of each polarizing unit is 20-100 layers.

The first film layer and the second film layer are made of metal.

The first film layer and the second film layer have the optical thickness of 100 nm-400 nm.

The optical thickness ratio between the first film layer and the second film layer is 1:0.6-1.5.

The first film layer and the second film layer have the same optical thickness.

The optical thickness ratio between the first film layer and the second film layer is 1:1.5.

The body is made of glass.

The present invention also provides an LCD, which comprises: a backlight module, an LCD panel disposed above the backlight module, and two polarizers disposed at the two sides of the LCD panel; the LCD panel comprising:

a first sub-pixel, a second sub-pixel, and a third sub-pixel arranged in an array, the first, second and third sub-pixels emitting different color of light; each polarizer comprising: a plurality of polarizing units disposed respectively corresponding to the first, second and third sub-pixel arrays; each polarizing unit being a multilayer film structure, comprising a transparent body, and a plurality of first film layers and a plurality of second film layers interleaved into a stack disposed on the body; for the polarizing unit disposed corresponding to each sub-pixel, the polarizing unit satisfying the following equation for the light within the wavelength range of the light emitted by the sub-pixel:

$$\frac{n_H^2 n_L^2}{n_H^2 + n_L^2} = n_G^2 \sin^2\theta_G$$

Wherein $n_H$ being the refraction index of the first film layer regarding the light within the wavelength range, $n_L$ being the refraction index of the second film layer regarding the light within the wavelength range, $n_H > n_L$, $n_G$ being the refraction index of the body regarding the light within the wavelength range, and $\theta_G$ being the angle between the light within the wavelength range and the body normal inside the body; wherein the first, second and third sub-pixels emitting light of red, green and blue respectively; wherein the polarizer being formed by vapor deposition, sputtering or spin coating.

Compared to the known techniques, the present invention provides the following advantages: the present invention provides an LCD device, whose polarizers comprise polarizing units arranged in an array, the polarizing unit being a multilayer film structure, comprising a transparent body, and t and a plurality of first film layers and a plurality of second film layers interleaved into a stack disposed on the body; after a plurality of reflections and refractions at the interfaces, the light being completely separated into S-polarized light and P-polarized light to form a linearly polarized light to achieve polarization. Moreover, each polarizing unit corresponding to a sub-pixel, and only needed to achieve polarization for the light within the wavelength range of the light emitted by the sub-pixel. As such, the selection of materials for the body, the first film layer and the second film layer only needs to satisfy the polarization conditions for above-mentioned wavelength range, without needing to satisfying the polarization conditions for the entire visible light range. The selection difficulty and production difficulty can both be reduced, and the contrast of the LCD is enhanced.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
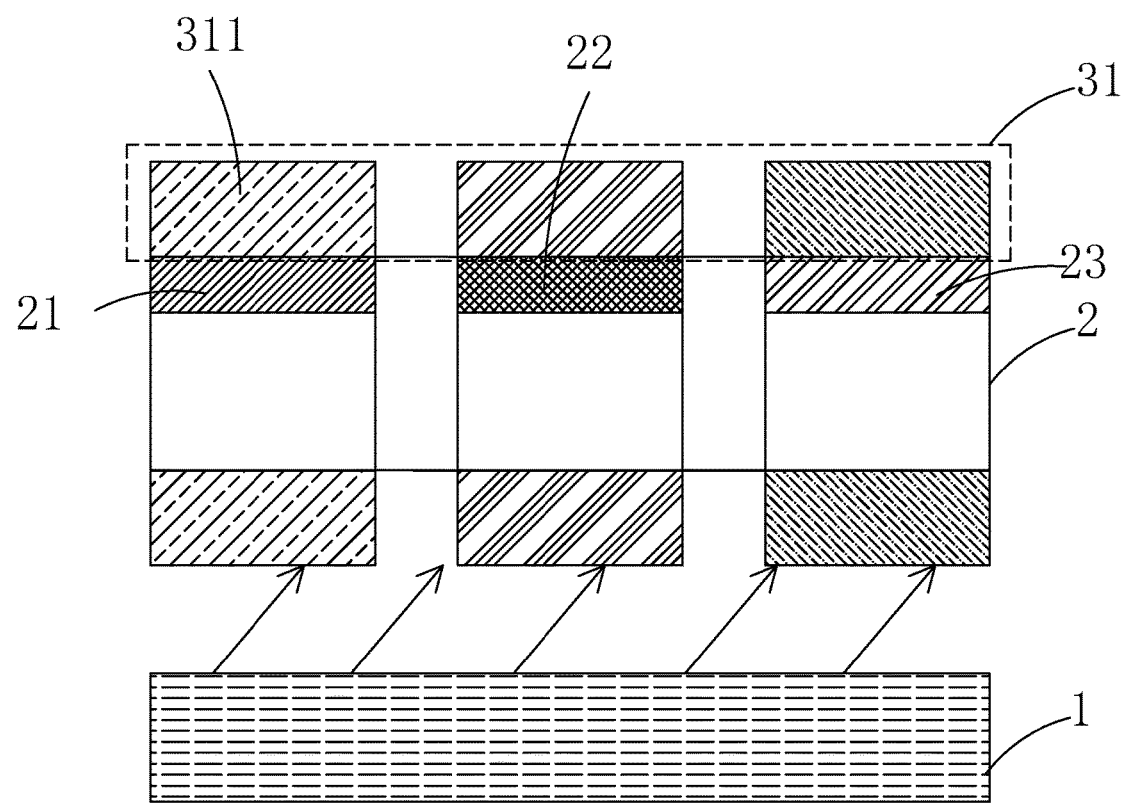
FIG. 1 is a schematic view showing the structure of the LCD device provided by an embodiment of the present invention.
Figure 2:
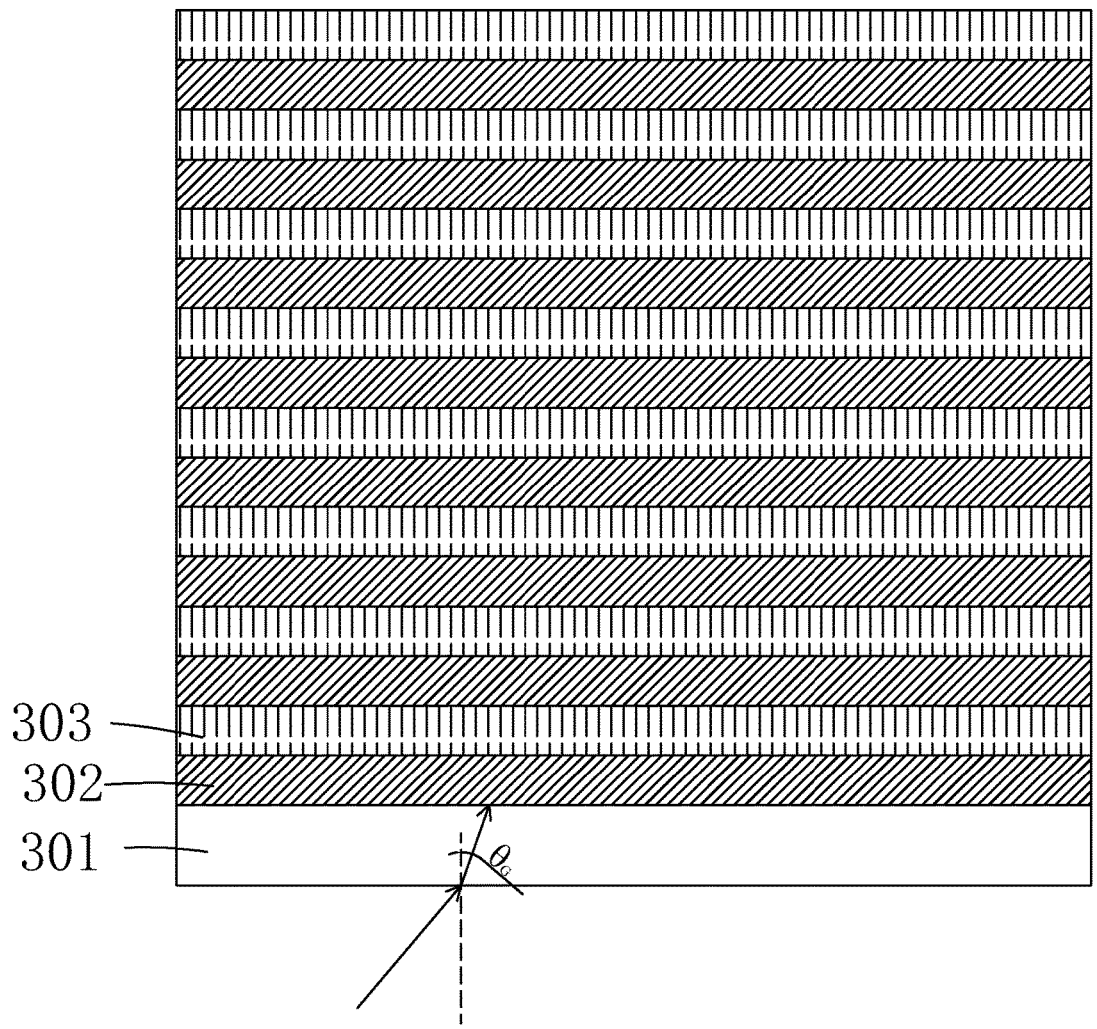
FIG. 2 is a schematic view showing the structure of the polarizing units of the LCD device provided by an embodiment of the present invention.

Refer to FIG. 1. The present invention provides an LCD, which comprises: a backlight module 1, an LCD panel 2 disposed above the backlight module 1, and two polarizers 31 disposed at the two sides of the LCD panel 2.

The LCD panel 2 comprises: a first sub-pixel 21, a second sub-pixels 22, and a third sub-pixel 23 arranged in an array, the first, second and third sub-pixels 21, 22, 23 emitting different color of light.

Each polarizer 31 comprises: a plurality of polarizing units 311 disposed corresponding to the first, second and third sub-pixels 21, 22, 23 and arranged in an array.

Each polarizing unit 311 is a multilayer film structure, comprising a transparent body 301, and a plurality of first film layers 302 and a plurality of second film layers 303 interleaved into a stack disposed on the body 301.

For the polarizing unit 311 disposed corresponding to each sub-pixel, the polarizing unit 311 satisfies the following equation for the light within the wavelength range of the light emitted by the sub-pixel:

$$\frac{n_H^2 n_L^2}{n_H^2 + n_L^2} = n_G^2 \sin^2\theta_G \qquad (1)$$

Wherein $n_H$ being the refraction index of the first film layer 302 regarding the light within the wavelength range, $n_L$ being the refraction index of the second film layer 303 regarding the light within the wavelength range, $n_H > n_L$, $n_G$ being the refraction index of the body 301 regarding the light within the wavelength range, and $\theta_G$ being the angle between the light within the wavelength range and the body normal inside the body 301.

Preferably, the first, second and third sub-pixels 21, 22, 23 emit light of red, green and blue respectively. The polarizing unit 311 disposed corresponding to the first sub-pixel 21 satisfies the equation (1) for the light within the wavelength range of the red light; the polarizing unit 311 disposed corresponding to the second sub-pixel 22 satisfies the equation (1) for the light within the wavelength range of the green light; and the polarizing unit 311 disposed corresponding to the third sub-pixel 23 satisfies the equation (1) for the light within the wavelength range of the blue light.

It should be noted that, compared to known technology using a polarizer formed with an overall multilayer film structure, the present invention divides the polarizer into a plurality of polarizing units disposed corresponding to each sub-pixel, and then uses a multilayer film structure to construct the polarizing unit corresponding to each sub-pixel so that each polarizing unit only needs to satisfy equation (1) for the light within the wavelength of the light emitted by the corresponding sub-pixel, instead of the entire range of visible light. As such, the material selection difficulty for the multilayer structure is reduced, and the material precision and LCD contrast are both improved.

Optionally, the polarizers 31 are formed by vapor deposition, sputtering or spin coating.

Specifically, take the polarizing unit 311 corresponding to the green light emitting second sub-pixel 22 as example. The wavelength range of green light is 490 nm-550 nm, i.e., centered at 520 nm with bandwidth 30 nm. The material for the first film layer 302 and the second film layer 303 polarizing unit 311 only needs to satisfy equation (1) within the wavelength range 520±30 nm, as opposed to the 380 nm-780 nm. The large reduction of wavelength range also reduces the material selection difficulty. Preferably, the refraction index of the first film layer is 1.2-1.5, and the second film layer 303 is 1.7-2.3.

Specifically, the first film layer 302 and the second film layer 303 have the optical thickness (i.e., the product of refraction index and physical thickness of the film layer) of 100 nm-400 nm.

Specifically, the optical thickness ratio between the first film layer 302 and the second film layer 303 is 1:0.6-1.5. Optionally, the first film layer 302 and the second film layer 303 may have the roughly equal optical thickness, or other ratio, for example, the optical thickness ratio between the first film layer 302 and the second film layer 303 is 1:1.5.

Preferably, the first film layer 302 and the second film layer 303 are made of metal, and the metal-made polarizers 31 are made by vapor deposition or sputtering respectively. Compared to known polarizers, the present invention provides obvious advantages of thermal stability, humidity resistance, and reliability as well as easier manufacturing process.

Preferably, the body 301 is made of glass.

In summary, the present invention provides an LCD device, whose polarizers comprise polarizing units arranged in an array, the polarizing unit being a multilayer film structure, comprising a transparent body, and t and a plurality of first film layers and a plurality of second film layers interleaved into a stack disposed on the body; after a plurality of reflections and refractions at the interfaces, the light being completely separated into S-polarized light and P-polarized light to form a linearly polarized light to achieve polarization. Moreover, each polarizing unit corresponding to a sub-pixel, and only needed to achieve polarization for the light within the wavelength range of the light emitted by the sub-pixel. As such, the selection of materials for the body, the first film layer and the second film layer only needs to satisfy the polarization conditions for above-mentioned wavelength range, without needing to satisfying the polarization conditions for the entire visible light range. The selection difficulty and production difficulty can both be reduced, and the contrast of the LCD is enhanced.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display (LCD) device, which comprises: a backlight module, an LCD panel disposed above the backlight module, and two polarizers each disposed at one of two sides of the LCD panel, respectively;
   the LCD panel comprising: a first sub-pixel, a second sub-pixel, and a third sub-pixel arranged in an array, the first, second and third sub-pixels emitting different color of light;
   each polarizer comprising: a plurality of polarizing units disposed respectively corresponding to the first, second and third sub-pixels;
   each polarizing unit being a multilayer film structure, comprising a transparent body, and a plurality of first film layers and a plurality of second film layers interleaved into a stack disposed on the body;
   for the polarizing unit disposed corresponding to each sub-pixel, the polarizing unit satisfying the following equation for the light within the wavelength range of the light emitted by the sub-pixel:

$$\frac{n_H^2 n_L^2}{n_H^2 + n_L^2} = n_G^2 \, \text{Sin}^2 \theta_G$$

wherein $n_H$ being the refraction index of each of the first film layers regarding the light within the wavelength range, $n_L$ being the refraction index of each of the second film layers regarding the light within the wavelength range, $n_H > n_L$, $n_G$ being the refraction index of the body regarding the light within the wavelength range, and $\theta_G$ being an angle inside the body between the light within the wavelength range and an imaginary line normal to a surface of the body opposite to the first and second film layers.

2. The LCD device as claimed in claim 1, wherein the first, second and third sub-pixels emit light of red, green and blue respectively.

3. The LCD device as claimed in claim 1, wherein the polarizers are formed by vapor deposition, sputtering or spin coating.

4. The LCD device as claimed in claim 1, wherein the sum of the number of layers in the first film layers and the second film layers of each polarizing unit is 20-100 layers.

5. The LCD device as claimed in claim 1, wherein the first film layers and the second film layers are made of metal.

6. The LCD device as claimed in claim 1, wherein each of the first film layers and each of the second film layers have the optical thickness of 100 nm-400 nm.

7. The LCD device as claimed in claim 1, wherein the optical thickness ratio between a first film layer and a second film layer is 1:0.6-1.5.

8. The LCD device as claimed in claim 7, wherein the first film layer and the second film layer have the same optical thickness.

9. The LCD device as claimed in claim 7, wherein the optical thickness ratio between the first film layer and the second film layer is 1:1.5.

10. The LCD device as claimed in claim 1, wherein the body is made of glass.

11. A liquid crystal display (LCD) device, which comprises: a backlight module, an LCD panel disposed above the backlight module, and two polarizers each disposed at one of two sides of the LCD panel, respectively;
    the LCD panel comprising: a first sub-pixel, a second sub-pixel, and a third sub-pixel arranged in an array, the first, second and third sub-pixels emitting different color of light;

each polarizer comprising: a plurality of polarizing units disposed respectively corresponding to the first, second and third sub-pixels;

each polarizing unit being a multilayer film structure, comprising a transparent body, and a plurality of first film layers and a plurality of second film layers interleaved into a stack disposed on the body;

for the polarizing unit disposed corresponding to each sub-pixel, the polarizing unit satisfying the following equation for the light within the wavelength range of the light emitted by the sub-pixel:

$$\frac{n_H^2 n_L^2}{n_H^2 + n_L^2} = n_G^2 \sin^2 \theta_G$$

wherein $n_H$ being the refraction index of each of the first film layers regarding the light within the wavelength range, $n_L$ being the refraction index of each of the second film layers regarding the light within the wavelength range, $n_H > n_L$, $n_G$ being the refraction index of the body regarding the light within the wavelength range, and $\theta_G$ being an angle inside the body between the light within the wavelength range and an imaginary line normal to a surface of the body opposite to the first and second film layers;

wherein the first, second and third sub-pixels emitting light of red, green and blue respectively;

wherein the polarizers being formed by vapor deposition, sputtering or spin coating.

12. The LCD device as claimed in claim 11, wherein the sum of the number of layers in the first film layers and the second film layers of each polarizing unit is 20-100 layers.

13. The LCD device as claimed in claim 11, wherein the first film layers and the second film layers are made of metal.

14. The LCD device as claimed in claim 11, wherein each of the first film layers and each of the second film layers have the optical thickness of 100 nm-400 nm.

15. The LCD device as claimed in claim 11, wherein the optical thickness ratio between a first film layer and a second film layer is 1:0.6-1.5.

16. The LCD device as claimed in claim 15, wherein the first film layer and the second film layer have the same optical thickness.

17. The LCD device as claimed in claim 15, wherein the optical thickness ratio between the first film layer and the second film layer is 1:1.5.

18. The LCD device as claimed in claim 11, wherein the body is made of glass.

* * * * *